United States Patent [19]

Harwood

[11] Patent Number: 5,626,356
[45] Date of Patent: May 6, 1997

[54] ADJUSTABLE WEIGHT DISTRIBUTION SYSTEM FOR HIGHWAY VEHICLES

[76] Inventor: Michael R. Harwood, 30104 Heather Oak Dr., Junction City, Oreg. 97448

[21] Appl. No.: 395,424

[22] Filed: Feb. 28, 1995

[51] Int. Cl.$^6$ ........................................... B60D 1/42
[52] U.S. Cl. .................. 280/405.1; 280/438.1; 280/441; 280/476.1
[58] Field of Search .............. 280/405.1, 406.1, 280/407, 476.1, 482, 483, 489, 441, 439, 438.1, 407.1

[56] References Cited

U.S. PATENT DOCUMENTS

| | | | |
|---|---|---|---|
| 2,330,897 | 10/1943 | Kirksey | 280/407 |
| 2,410,241 | 10/1946 | Schramm | 280/33.44 |
| 2,495,943 | 1/1950 | Peterson | 280/476.1 |
| 2,605,114 | 7/1952 | Ronning | 280/33.5 |
| 2,847,228 | 8/1958 | Hall | 280/81 |
| 3,163,306 | 12/1964 | Bennett et al. | 280/476.1 |
| 3,413,015 | 11/1968 | Fontaine | 280/476.1 |
| 3,447,813 | 6/1969 | Wolf | 280/80 |
| 3,689,107 | 9/1972 | Humes | 280/426 |
| 4,070,033 | 1/1978 | Weir | 280/476.1 |
| 4,168,082 | 9/1979 | Hendrickson | 280/476 R |
| 4,226,437 | 10/1980 | Trudeau | 280/405 R |
| 4,314,709 | 2/1982 | Silbernagel | 280/405.1 |
| 4,451,058 | 5/1984 | Curry | 280/423 A |
| 4,463,966 | 8/1984 | Stoddard | 280/442 |
| 4,573,699 | 3/1986 | Smith | 280/432 |
| 4,705,288 | 11/1987 | Schmidt | 280/405 R |
| 4,740,005 | 4/1988 | Babin | 280/405 A |
| 4,759,563 | 7/1988 | Nash | 280/423 A |
| 4,993,729 | 2/1991 | Payne | 280/81.1 |
| 4,993,738 | 2/1991 | Bennett | 280/432 |

FOREIGN PATENT DOCUMENTS

| | | | |
|---|---|---|---|
| 0320383 | 6/1989 | European Pat. Off. | 280/441 |
| 0139768 | 6/1987 | Japan | 280/441 |

*Primary Examiner*—Anne Marie Boehler
*Attorney, Agent, or Firm*—Marger, Johnson, et al.

[57] ABSTRACT

A dolly distributes weight between a highway truck and trailer while at the same time maintaining an extended wheelbase between load bearing axles. A front end of the dolly includes a king pin that joins to a sliding fifth wheel located on the truck frame. A second fifth wheel is joined to the rear end of the dolly and receives a corresponding king pin on the front end of the trailer. A pivot assembly is joined to a center section of the dolly and is pivotally joined to a rear end of the truck frame. The pivot assembly serves to pivot weight between the front and rear end of the dolly and also maintains the dolly in a rigid longitudinal alignment with the truck. Air bags are located between the steerable dolly wheels and the the rear end of the dolly to further increase adjustability of trailer weight distribution.

19 Claims, 3 Drawing Sheets

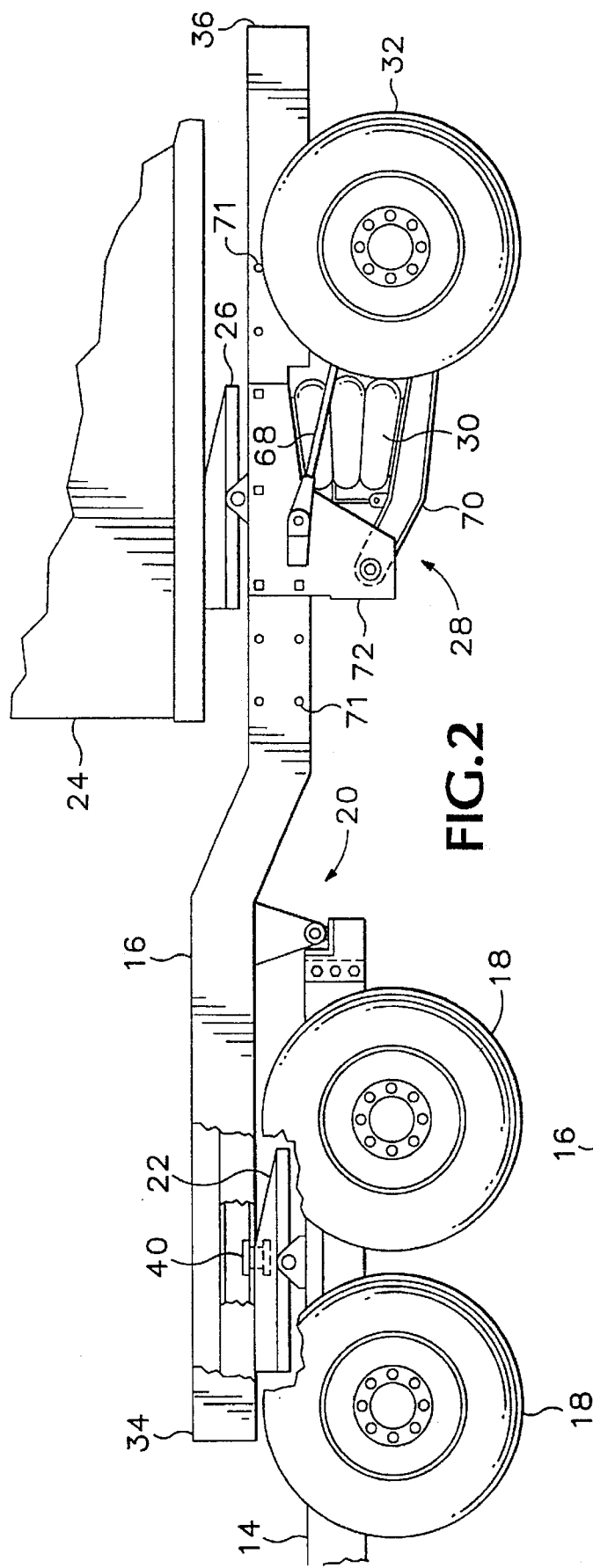
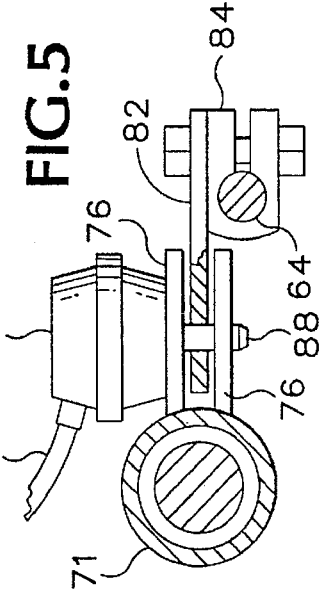
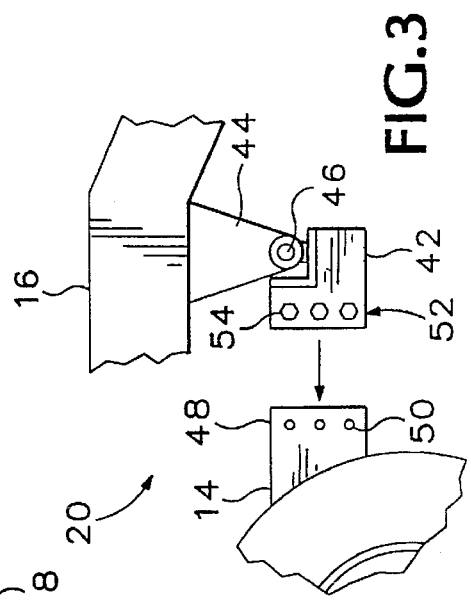

ADJUSTABLE WEIGHT DISTRIBUTION SYSTEM FOR HIGHWAY VEHICLES

BACKGROUND OF THE INVENTION

This invention relates generally to a system for connecting a highway truck to a trailer and more particularly to a dolly that provides adjustable weight distribution.

U.S. Pat. No. 4,070,033 to Weir et al. describes a dolly having an inclined frame supported at its lower rear end on running gear. A forward end of the dolly includes a king pin connected to a truck fifth wheel. A second fifth wheel is located on top of the dolly and is repositionable on the inclined frame. The dolly fifth wheel interlocks with a kingpin on the highway trailer. The dolly fifth wheel allows weight of the trailer to be distributed at different locations on the dolly.

The dolly in Weir et al. is difficult to control while the truck is going both in a forward and backward direction. For example, two separate pivot points exist between the truck and dolly (truck fifth wheel) and the dolly and trailer (dolly fifth wheel). The two pivot locations on the dolly both rotate when the truck is navigating around corners making the dolly and trailer difficult to control. The dual pivot points make the dolly and trailer even more difficult to control while the truck is backing up.

The dolly in Weir et al. also has limited adjustability with respect to both weight distribution and extendable wheelbase. For example, to displace more weight on the drive tires of the truck, the slideable king pin must be moved closer to the front end of the dolly. This results in reducing the effective overall wheelbase between the drive wheels on the truck and the tandem wheels on the trailer. Thus, the dolly may not meet state regulations which specify maximum vehicle weight according to interaxle distance.

Accordingly, a need remains for a weight distribution system for highway vehicles that is easy to control while also maintaining increased between the axles of the truck and trailer.

SUMMARY OF THE INVENTION

A dolly distributes weight between a highway truck and trailer while at the same time maintaining an extended wheelbase between loadbearing axles. A front end of the dolly includes a king pin that engages a sliding fifth wheel located on the truck frame. A second fifth wheel is located on the rear end of the dolly and receives a king pin joined to the front end of the trailer. The dolly fifth wheel is also movable both fore and aft to tune weight distribution of the trailer.

A pivot assembly located at the center of the dolly is pivotally joined to a rear end of the truck frame. The fifth wheel on the truck frame is movable both fore-and aft and serves to adjust the weight of the trailer at different locations over the truck drive tires. For example, moving the truck fifth wheel slideable, places more weight on the truck drive wheels.

The pivot assembly serves to pivot weight between the front and rear end of the dolly and also maintains the dolly in a rigid longitudinal alignment with the truck. Thus, the dolly, and correspondingly the trailer, are more easily controlled when the truck is moving in a forward and reverse direction. To further increase controllability, the dolly includes a steerable rear wheel assembly that can be locked when the truck is placed in reverse.

Air bags are located between the steerable rear wheel assembly and rear end of the dolly. The air bags also distribute weight between the front and back end of the dolly. For example, deflating the air bags places more weight the truck drive wheel axle and inflating the air bags place more weight on the rear axle of the dolly.

Weight distribution is adjustable without varying the interaxle distance between the truck drive tires and the rear trailer tires. Thus, the dolly is more adaptable to different loading conditions while at the same time easier to control than other vehicle highway weight distribution systems.

The foregoing and other objects, features, and advantages of the invention, will become more readily apparent from the following detailed description of a preferred embodiment of the invention which proceeds with reference to the accompanying drawings.

BRIEF DESCRIPTION OF THE DRAWINGS

FIG. 2 is an enlarged side view of the dolly shown in FIG. 1.

FIG. 3 is an isolated side view of a pivot assembly shown in FIG. 1.

FIG. 5 is a side-sectional view of a lock-out device shown in FIG. 4.

DETAILED DESCRIPTION

Figure 1:
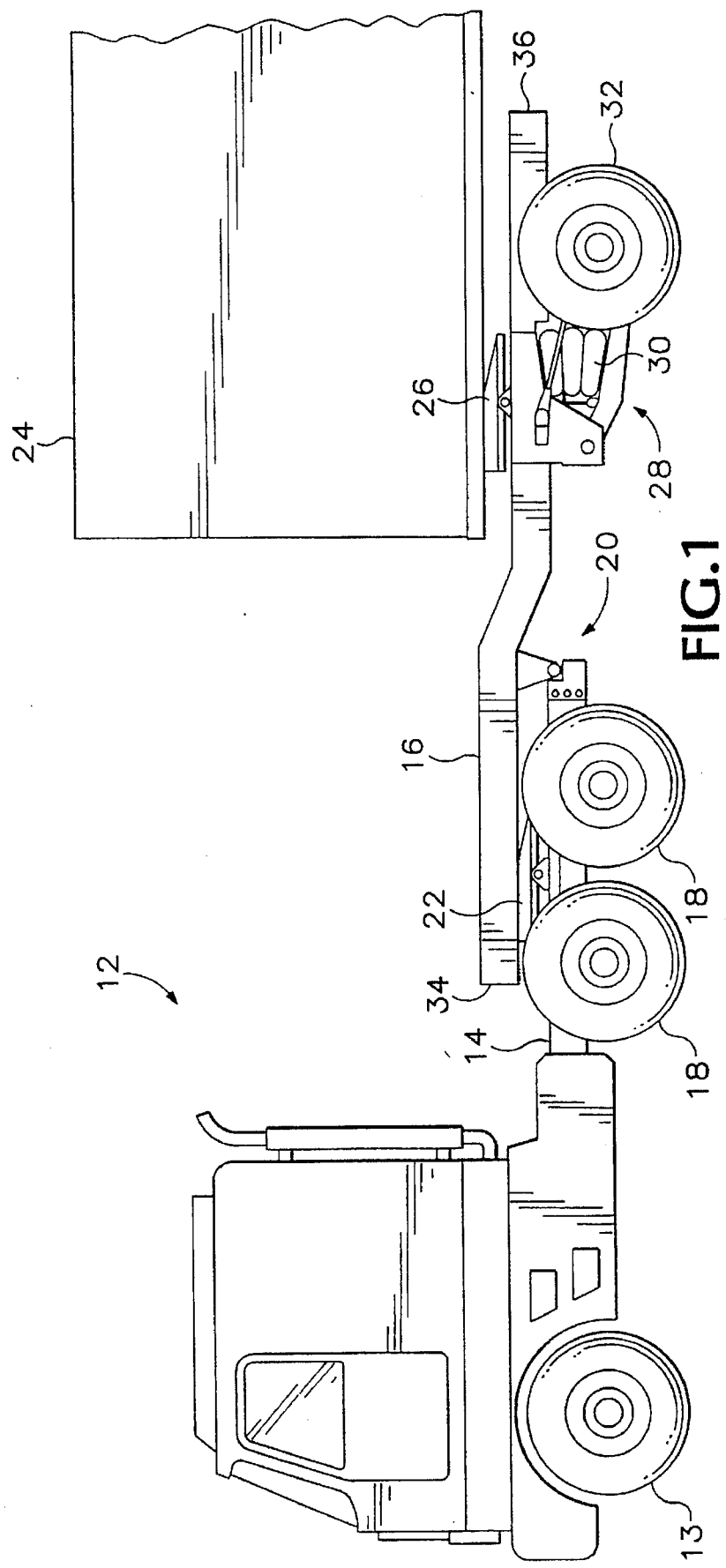
FIG. 1 is a side view of a dolly according to the invention joined between a highway truck and trailer.

FIG. 1 is a side view of a dolly 16 joined between a highway truck 12 and a highway trailer 24. Truck 12 is conventional having a frame 14 and drive wheels 18. The trailer 24 is also conventional having a king pin (not shown) attached at a front end for engaging with a fifth wheel. Trailer 24 also includes one or more rear axles (not shown) attached at a rear end of the trailer.

The dolly 16 includes a front end 34 and a rear end 36. A king pin (FIG. 2) is slidingly joined to the front end of the dolly for interlocking to a first fifth wheel 22 attached onto truck frame 14. A second fifth wheel 26 is joined to the rear end 36 of dolly 16 and interlocks with the king pin (not shown) on the front of trailer 24. A pivot assembly 20 is welded to a center section of dolly 16 and pivots about a rear end of truck frame 14. A wheel assembly 28 is coupled to the rear end of dolly 16 and includes an inflatable air bag 30 and rear wheels 32.

Figure 4:
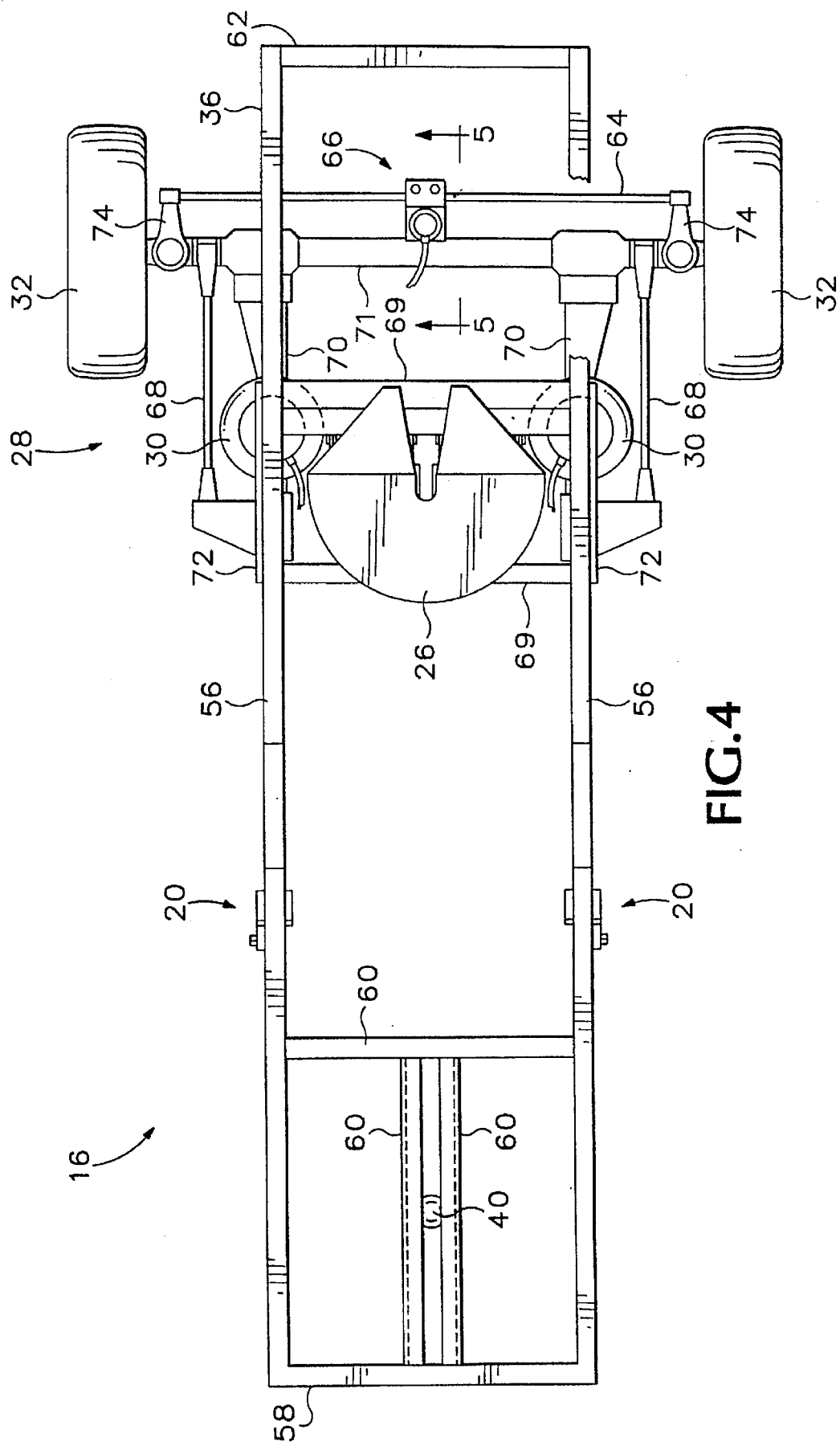
FIG. 4 is a top view of the dolly shown in FIG. 1.

FIG. 2 is a partially broken away side view of the dolly 12 shown in FIG. 1o The fifth wheel 22 is slideable, both fore-and-aft, along the front end of dolly 16 (see FIG. 4). King pin 40 is movable into different positions to align with corresponding positions of fifth wheel 22. The engagement apparatus other than the repositioning features of the king pin and the fifth wheel 22 are conventional.

The fifth wheel 22 is moved forward to move the contact point between the front end 34 of dolly 16 and the frame 14 of truck 12. For example, moving the fifth wheel 22 rearward moves the weight of the trailer 24 toward the rear of frame 14. As a result, more trailer weight is moved onto the axel of drive wheels 18. When the fifth wheel 22 is moved forward, trailer weight is moved forward of drive wheels 18 and more weight taken up by the axel of dolly wheels 32.

The wheel assembly 28 is attached to the rear end of dolly 16 by mounting plates 72 that are welded onto the lateral sides of dolly 16. The air bags 30 provide additional control of weight distribution of the trailer 24. For example, inflating the air bags places more weight on the steering axle at the rear of the end of the dolly. Deflating the air bags 30 distributes more weight on the axle of the drive wheels 18.

The air bags 30 also place the dolly wheels in contact with the highway. For example, when less weight is placed on the rear end 36 of dolly 36, the air bags 30 can be inflated to ensure contact of wheels 32 with the highway. Thus, the rear end of dolly 16 is prevented from fishtailing. The air bag and pneumatic controls necessary for inflating the air bag are convention and are, therefore, not described in detail.

It is important to note that weight distribution can be adjusted without altering the wheelbase distance between the drive wheels 18 and the rear wheels of the trailer. For example, weight is redistributed about the dolly 16 by moving any combination of fifth wheel 22 and air bags 30. Moving either fifth wheel 22 or adjusting air bags 30 does not affect the wheelbase distance. Thus, weight adjustment will not effect the truck-trailer wheelbase as shown in Weir et al.

Referring to both FIGS. 2 and 3, the pivot assembly 20 includes two triangular shaped flanges 44 welded to the bottom of dolly 16 on opposite lateral sides (see FIG. 4). The bottom apex of flanges 44 are each pivotally coupled by a hinge 46 to a mounting plate 42. The mounting plate 42 includes holes 52 that align with holes 52 in the rear end 48 of truck frame 14. After the holes 50 and 52are aligned together, bolts 54 are inserted inside the aligned holes rigidly joining the mounting plate 42 to truck frame 14.

The pivot assembly 20 holds the dolly in a rigid lateral alignment in relation to truck 12 while at the same time allowing the dolly 16 to pivot about an axis extending transversely across the rear end of truck 12. Thus, the pivot assembly increases lateral stability of the dolly 16 while also serving as a pivot point for teetering weight between the front and rear end of dolly 16.

FIG. 4 is a top view of the dolly 16 shown in FIG. 1. The dolly 16 includes lateral side beams 56 joined at a front end by front beam 58 and joined rear end 36 by rear beam 62. A pair of slide members 60 are welded between front beam 58 and a cross beam 60. The slide members are slidingly engaged with king pin 40. King pin 40 slides both fore and slideable between slide members 60 to align with fifth wheel 22 (FIG. 1).

The steerable wheel assembly 28 includes upper and lower struts 68 and 70, respectively, each hingedly coupled at front ends to mounting plate 72. The rear ends of the struts are pivotally coupled to axle 71. The air bags 30 rest on lower struts 70 and press up against the lower side of the dolly 16.

The fifth wheel 26 is attached to the top of support plates 69. An array of bolt holes 71 (FIG. 2) are located on the rear end 36 of dolly 16 for receiving bolts that hold support plates 69. The fifth wheel 26 can, in turn, be moved both fore-and-aft on the rear end of dolly 16 at the different bolt hole locations to fine tune weight distribution of trailer 24.

The relocatable support plates 69 also adjust the wheelbase distance between the drive wheels 18 and the rear wheels of trailer 24 (not shown). For example, moving mounting plates 72 aft increases the wheelbase distance between drive wheels 18 and the rear trailer wheels. The adjustable wheelbase provided by the two movable fifth wheels allow adjustment of the dolly 16 for different state bridge length requirements.

The wheels 32 are turned by a conventional steering assembly which includes a steering rod 64 joined at opposite ends to wheel linkage 74.

Referring to both FIGS. 4 and 5, a locking mechanism 66 comprises upper and lower plates 76 welded onto axle 71. A pneumatically controlled actuator 78 includes an air hose 80 and a pin 88. Two holes are located in vertical alignment through plates 76. The actuator 78 is located over plates 76 so that pin 88 passes through the plate holes when in a extended condition. A lockout plate 82 is rigidly held to steer rod 64 by clamp 84. The actuator 78 is conventional and is therefore, not described in detail.

When deactivated, pin 88 is retracted inside the actuator 78. Lockout plate 82 is then free to slide between plates 76. Steer rod 64 and in turn, wheels 32 are then steered in either a left or right direction. The dolly wheels 32 are controlled by conventional steering linkage that steers the wheels 32 in the same direction as the front wheels on truck 12.

At times, the rear dolly tires 32 need to be locked. For example, dolly wheels 32 are locked so that trailer 24 can be moved straight without fishtailing. To lock wheels 32, air pressure is increased in hose 80 causing pin 88 to move through the holes in plates 76 and through a corresponding hole in lockout plate 82. Lockout plate 82 and, in turn, steer rod 64 is then locked into a rigid lateral position allowing the tailer to be moved straight back. The actuator 78 is either automatically or manually enabled. For example, the actuator 78 can be automatically enabled when the truck 12 is placed in reverse. Alternatively, the actuator can be manually activated whenever the tailer must maintain a straight line.

Thus, the steerable wheel assembly 28 and the lockout device 66 on dolly 16 provide more steering control than present dolly systems while at the same time providing more adjustable weight distribution. The dolly 16 is operable with any standard trailer, log hauler, belly dump, flatbed etc. typically hauled by a convention highway truck.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for distributing weight between a truck having rear drive wheels and a trailer, comprising:

a dolly having a front end and a rear end;

a king pin slidingly joined to the front end of the dolly for interlocking to a first fifth wheel on the truck, the first fifth wheel repositionable along a longitudinal direction of the truck and the king pin repositionable along a longitudinal direction of the dolly to align with the first fifth wheel;

a second fifth wheel joined to the rear end of the dolly for receiving the trailer; and a pivot member joined to a center section of the dolly and pivotally joined to a rear end of the truck for pivoting weight between the front and rear end of the dolly according to the longitudinal positions of the fifth wheel and the king pin while at the same time locking the dolly and truck together in a rigid longitudinal and lateral alignment.

2. A system according to claim 1 wherein the first fifth wheel is repositionable both fore and aft and slideable on the truck, the king pin slidingly alignable with each position of the first fifth wheel.

3. A system according to claim 1 wherein the pivot member comprises a hinge and a bracket, the hinge pivotally joined to the bracket and the bracket detachably joined to a rear end of the truck.

4. A system according to claim 1 including a steerable wheel assembly joined to a rear end of the dolly.

5. A system for distributing weight between a truck having rear drive wheels and a trailer, comprising:
   a dolly having a front end and a rear end;
   a king pin slidingly joined to the front end of the dolly for interlocking to a first fifth wheel on the truck;
   a second fifth wheel joined to the rear end of the dolly for receiving the trailer;
   a pivot member joined to a center section of the dolly and pivotally joined to a rear end of the truck for pivoting weight between the front and rear end of the dolly;
   a steerable wheel assembly joined to the rear end of the dolly; and
   airbags joined between the steerable wheel assembly and a rear end of the dolly, the air bags redistributing weight between the drive wheels and the wheel assembly.

6. A system according to claim 5 wherein the wheel assembly includes struts pivotally joined at a front end to mounting plates attached to opposite lateral sides of the dolly and pivotally joined at the rear axle.

7. A system for distributing weight between a truck having rear drive wheels and a trailer, comprising:
   a dolly having a front end and a rear end;
   a king pin slidingly joined to the front end of the dolly for interlocking to a first fifth wheel on the truck;
   a second fifth wheel joined to the rear end of the dolly for receiving the trailer; and
   a pivot member joined to a center section of the dolly and pivotally joined to a rear end of the truck for pivoting weight between the front and rear end of the dolly; and
   a steerable wheel assembly joined to a rear end of the dolly, the wheel assembly including two rear wheels each rotatable about opposite ends of the rear axle, a steer rod joined between the two rear wheels and a locking mechanism rigidly joined to the rear axle and selectively lockable to the steer rod.

8. A system according to claim 7 wherein the locking mechanism comprises an upper and lower rear axle plate each rigidly joined to the rear axle, a pneumatically controlled locking pin vertically displaceable between the upper and lower plates, and a locking plate rigidly joined to the steer rod and slidingly displaceable between the upper and lower rear axle plates, the locking axle plate including a center hole for receiving the locking pin.

9. A system according to claim 1, includes two slide bars rigidly joined between the front end of the dolly and a traverse cross member, the king pin slideable between the two slide bars.

10. A system according to claim 1 wherein the front end of the dolly extends horizontally over the rear end of the truck, the rear end of the dolly extends horizontally underneath the trailer and including a middle diagonal section extending down from the front end of the dolly to the rear end of the dolly.

11. A dolly for attaching between a truck and a trailer, the truck having rear drive wheels and a frame and the dolly further comprising:
   a front end for attaching onto the truck frame;
   dolly rear wheels attached to a rear end of the dolly;
   a first weight distribution means attached at the front end of the dolly for interlocking the dolly to the truck frame and redistributing weight of the trailer between the truck rear drive wheels and the dolly rear wheels;
   a second weight distribution means attached to the dolly wheels for further redistributing weight of the trailer between the truck rear drive wheels and the dolly rear wheels; and
   a hinge rigidly joined to a center section of the dolly, between the first and second weight distribution means, the hinge for pivotally joining the dolly to the truck frame and serving as a pivot for redistributing weight of the trailer between the truck rear drive wheels and the dolly rear wheels while at the same time holding the dolly in a rigid lateral and longitudinal alignment with the truck while the truck moves in both a forward and rearward direction.

12. A dolly according to claim 11 wherein the first weight distribution means comprise a king pin slidingly joined to the front end of the dolly for interlocking the dolly to a first fifth wheel on the truck frame.

13. A dolly according to claim 11 wherein the second weight distribution means comprise means for vertically displacing the dolly wheels.

14. A dolly according to claim 13 including a steering assembly for steering the dolly rear wheels and a locking assembly for locking the dolly rear wheels in a parallel alignment with a longitudinal axis of the dolly.

15. A dolly according to claim 11 wherein the dolly further includes a dolly fifth wheel for interlocking with the trailer and means for moving the dolly fifth wheel in both a fore and an aft direction on the dolly.

16. A method for redistributing weight of a trailer between wheels on a rear end of a truck and wheels on a rear end of a dolly, comprising:
   moving a front contact point between the truck and the dolly horizontally along the rear end of the truck for distributing different proportions of the weight of the trailer onto the rear end of the truck;
   pivoting the weight of the trailer about a hinge located on a top side of the rear end of the truck, the hinge pivoting the weight of the trailer from the rear end of the dolly when weight is increased on the rear end of the truck and pivoting the weight of the trailer to the rear end of the dolly when weight is reduced on the rear end of the truck; and
   constantly pushing a set of wheels on the rear end of the dolly in a vertical downward direction thereby teetering weight of the trailer about the hinge from the rear end of the truck to the rear end of the dolly.

17. A method according to claim 16 including selectively steering and locking the dolly wheels.

18. A method according to claim 17 wherein the dolly wheels are automatically locked into a parallel position in relation to a longitudinal axis of the dolly when the truck is in reverse.

19. A method according to claim 18 wherein moving the front contact point further rearward on the truck places more weight on the truck drive wheels.

* * * * *